United States Patent
Yu et al.

(10) Patent No.: US 10,848,054 B2
(45) Date of Patent: Nov. 24, 2020

(54) ADAPTIVE STARTUP FOR SWITCHING POWER CONVERTER

(71) Applicant: DIALOG SEMICONDUCTOR INC., Campbell, CA (US)

(72) Inventors: Jiang Yu, Campbell, CA (US); Guang Feng, Campbell, CA (US); Qiu Sha, Campbell, CA (US); Qifeng Shi, Campbell, CA (US); Jianming Yao, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 183 days.

(21) Appl. No.: 16/182,507

(22) Filed: Nov. 6, 2018

(65) Prior Publication Data
US 2020/0144904 A1    May 7, 2020

(51) Int. Cl.
*H02M 1/36*    (2007.01)

(52) U.S. Cl.
CPC ...................... *H02M 1/36* (2013.01)

(58) Field of Classification Search
CPC . H02M 1/36; H02H 7/1203; H02H 7/12–127; H02H 9/001; H02H 9/002; G01R 31/00; G01R 31/40; G01R 31/42
See application file for complete search history.

(56) References Cited

U.S. PATENT DOCUMENTS

| | | | | |
|---|---|---|---|---|
| 2010/0195355 A1* | 8/2010 | Zheng | | H02M 3/33507 363/21.12 |
| 2013/0235621 A1* | 9/2013 | Yan | | H02M 3/33507 363/21.12 |
| 2013/0249524 A1* | 9/2013 | Kujala | | H02M 3/156 323/312 |
| 2016/0007417 A1* | 1/2016 | Gao | | H02M 3/33507 315/219 |
| 2016/0359422 A1* | 12/2016 | Yuan | | H02M 1/36 |

* cited by examiner

*Primary Examiner* — Fred E Finch, III
*Assistant Examiner* — Rafael O De Leon Domenech
(74) *Attorney, Agent, or Firm* — Haynes and Boone, LLP

(57) ABSTRACT

A switching power supply controller for a switching power supply is provided that measures an input voltage through an application of a load during an input voltage measurement period following connection of the switching power supply to an AC mains. Based upon the measured input voltage, the controller adjusts a start-up delay period so that the start-up delay period is substantially constant despite variations in an AC line voltage for the AC mains.

20 Claims, 4 Drawing Sheets

ADAPTIVE STARTUP FOR SWITCHING POWER CONVERTER

TECHNICAL FIELD

This application relates to switching power converter controllers, and more particularly to switching power converters with an adaptive startup time based upon the input voltage.

BACKGROUND

The high efficiency of switching power converters has led to their virtual universal adaption as the battery charger for mobile devices. In such switching power supplies, a rectifier such as a diode bridge rectifies an AC voltage from an AC mains into a rectified input voltage. During normal operation, a controller in the switching power supply cycles a power switch coupled to the input voltage to regulate an output voltage. This controller needs its own power supply voltage (also designated herein as VDD) to power its operation. During normal operation, the cycling of the power switch generates energy that is used to not only regulate the output voltage but also to maintain the controller power supply voltage. But at startup, the power switch is not cycling such that the switching power supply needs a start-up circuit to charge the controller power supply voltage.

One type of start-up circuit uses a high-voltage depletion-mode field effect transistor (FET) that couples in series with a resistor to the input voltage rail supplying the rectified input voltage. Such a start-up circuit is also denoted as an "active start-up" circuit due to its use of a FET. The depletion-mode FET is on with zero volts at its gate so it conducts when the switching power supply is plugged into the AC mains. The resistor/FET combination is also in series with a power supply capacitor for storing the controller power supply voltage so that the controller power supply voltage charges as the depletion-mode FET conducts. Once the controller power supply voltage reaches a power-on reset (POR) level, the controller begins normal operation and begins cycling the power switch. Since the power switch cycling maintains the controller power supply voltage during normal operation, the controller switches off the depletion-mode FET at the onset of normal operation. Since the depletion-mode FET is only on during the start-up period prior to normal operation, the resistor may have a relatively small resistance without impacting operational efficiency. This small resistance is advantageous with respect to operation in various countries or regions in which the AC voltage differs. For example, the RMS level for the AC voltage may range from approximately 85 VAC to as much as 270 VAC depending upon the location. But since the resistance is relatively low, the time difference for the controller power supply voltage to reach the POR level across these input voltage ranges is relatively small.

But active startup circuits increase the cost of manufacture. Since there are literally billions of devices worldwide that require a switching power supply, the cost of manufacture is an important factor in that relatively small savings still add up given the significant volume of manufacture. It is thus conventional to instead use a passive startup circuit in switching power supplies to lower costs. In a passive start-up circuit, the depletion-mode FET and relatively small resistance are eliminated and replaced by an RC circuit formed by by a resistor of relatively high resistance in series with the power supply capacitor. Since the resistor will conduct even during normal operation, its resistance must be relatively high to increase the power efficiency. If the resistance were instead relatively low, the RC circuit would lose too much power during normal operation. But the resulting time constant for the RC circuit will thus also be relatively large such that the start-up time to reach the POR level for the controller power supply voltage will vary widely depending upon the AC voltage. For example, the start-up time for a low line level may be five times that for a high line level.

The wide range of start-up times for a switching power supply having a passive start-up circuit is problematic in that a switching power supply must typically satisfy both a minimum start-up time and a maximum start-up time. The minimum start-up time addresses fault issues such as a short-circuit at start-up. The short-circuit is sensed by the controller, which then shuts down operation and re-starts. If the short circuit fault persists and the minimum start-up time too short, the switching power supply will rapidly cycle on and off so as to stress its components. But customers also have a reasonable expectation of the charging functioning upon plugging in the device so that creates the need for a maximum start-up time.

Accordingly, there is a need in the art for switching power supplies having passive start-up circuits with controlled start-up times.

SUMMARY

To address the need in the art for a switching power supply having a passive start-up circuit to generate a controller power supply voltage over a start-up delay period that is substantially constant despite AC line variations, a controller is provided that measures the rate of decay for the controller power supply voltage to measure an input voltage for the switching power supply. When the switching power supply is connected to an AC mains, a rectifier such as a diode bridge rectifies the AC line voltage to produce the input voltage. During normal operation, the controller controls the cycling of a power switch to maintain the controller power supply voltage. But the normal operation does not begin following the connection to the AC mains until an expiration of the start-up delay period. The passive start-up circuit thus generates the controller power supply voltage during the start-up delay period.

Upon connection of the switching power supply to the AC mains, the controller power supply voltage rises from ground due to the charging by the passive start-up circuit. The passive start-up circuit is an RC circuit and thus includes a resistor and a power supply capacitor in series between the input voltage rail and ground. The power supply capacitor stores the controller power supply voltage. When the controller power supply voltage reaches a threshold level, the controller applies a load across the power supply capacitor to reduce the controller power supply voltage over an input voltage detection period. The controller knows all the following parameters since these values may be programmed into the controller during manufacture: the resistance and capacitance for the passive start-up circuit as well as the current conducted by the load. A measurement circuit and a start-up timing circuit in the controller may then determine the duration of the input voltage detection period and the change in the controller power supply voltage over the input voltage detection period to determine the input voltage in light of the other known parameters. With the input voltage thus determined, the start-up timing circuit may then adjust the duration of the start-up delay period so that it is substantially constant despite any variations in the AC line voltage. Upon termination of the start-up delay period, the controller begins normal operation in which it cycles the power switch to regulate an output voltage and also to maintain the controller power supply voltage. Although the passive start-up circuit continues to conduct during normal operation, the power drain is relatively small since the resistance for the passive start-up circuit is relatively high.

The resulting control of the start-up delay period is quite advantageous since it lowers cost by allowing the use of a passive start-up circuit. In contrast, the conventional use of an active start-up circuit to provide a stable start-up delay period increases costs since a separate depletion-mode transistor must be integrated on a circuit board with the controller. But the measurement circuit and the start-up timing circuit disclosed herein are integrated within the controller and are thus low cost.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To reduce cost and still provide a controlled start-up time despite the use of a passive start-up circuit, a switching power supply controller is disclosed that detects the input voltage by applying a load across the power supply capacitor that stores the controller power supply voltage. The controller begins operation once the controller power supply voltage reaches a power-on reset (POR) level, at which point the controller applies the load. Based upon the rate of change in the controller power supply voltage resulting from the load application, the controller determines the input voltage and adjusts a delay period length between the POR time and the onset of normal operation in which the controller cycles the power switch. The delay period is shortened if the input voltage is relatively low whereas the controller increases the delay period if the input voltage is relatively high. By adjusting the delay period in response to the input voltage detection, the controller maintains the start-up delay to be substantially constant. The start-up delay is the delay from the initiation of the start-up process to the onset of normal operation. The resulting constant start-up delay is quite advantageous as the cost of manufacture is reduced due to the use of a passive start-up circuit yet the start-up delay is not excessively short or long despite AC line level variations.

Figure 1:
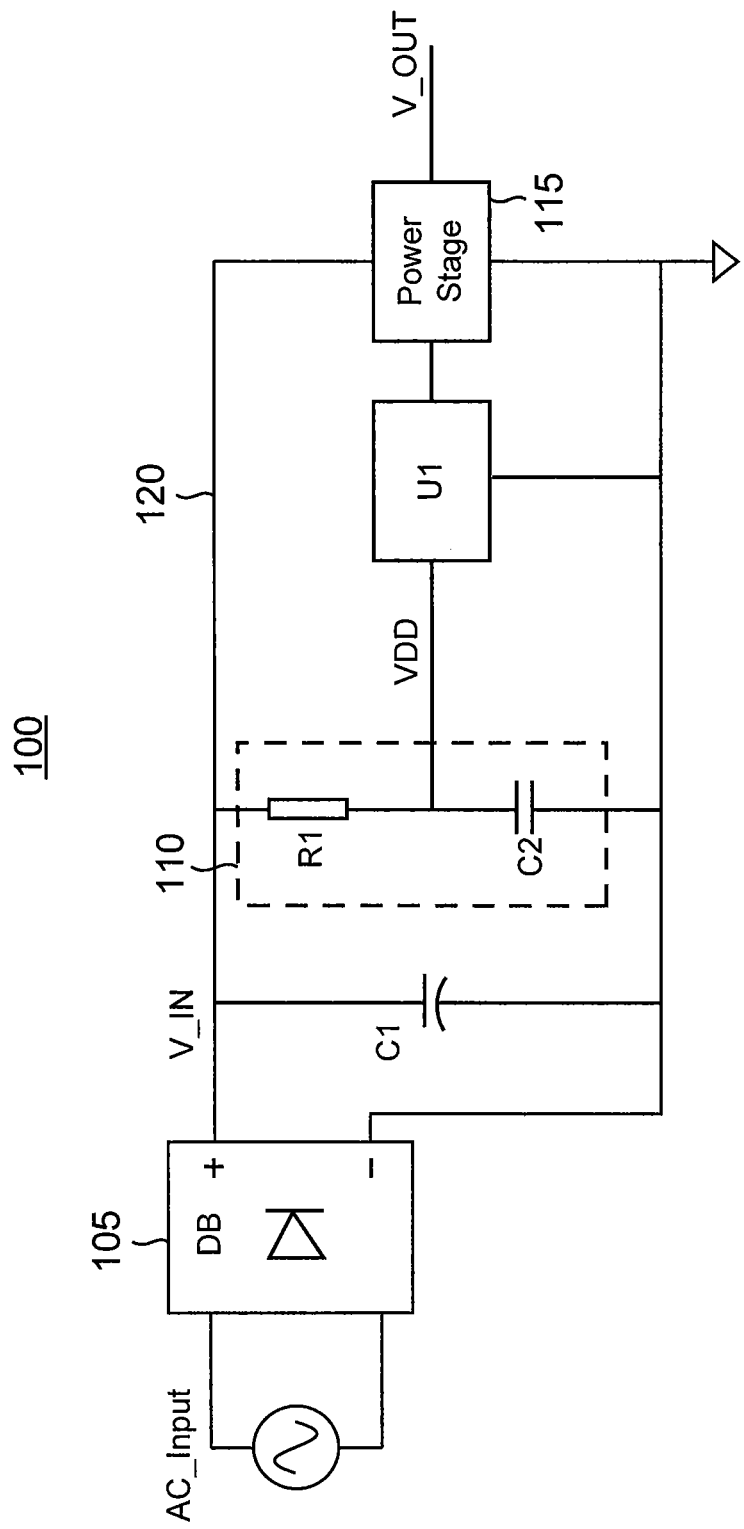
FIG. 1 illustrates a switching power supply having a passive start-up circuit and a controller configured to control a start-up delay period to be independent of AC line variations in accordance with an aspect of the disclosure.

Turning now to the drawings, an example switching power supply 100 is shown in FIG. 1. An AC mains provides an AC line voltage (AC_Input) that is rectified by a diode bride (DB) 105 to produce a rectified input voltage (V_IN) carried on an input voltage rail 120. The input voltage is smoothed by an input capacitor C1 that couples between input voltage rail 120 and ground. As discussed earlier, a passive start-up circuit 110 includes a resistor R1 in series with a power supply capacitor C2. Passive start-up circuit 110 couples between input voltage rail 120 and ground. The power supply capacitor C2 stores a controller power supply voltage VDD for a controller U1. A power stage 115 includes a power switch (not illustrated) that cycles during normal operation as controlled by controller U1 to regulate an output voltage (V_OUT). The details of power stage 115 depend upon the particular architecture for switching power supply 100. For example, power stage 115 would include a transformer in a flyback converter. The power switch would then be coupled to the primary winding of the transformer whereas the output voltage would be produced on the secondary side of the transformer. Conversely in a DC-DC switching power supply such as buck converter, the power switch would drive an inductor.

Figure 2:
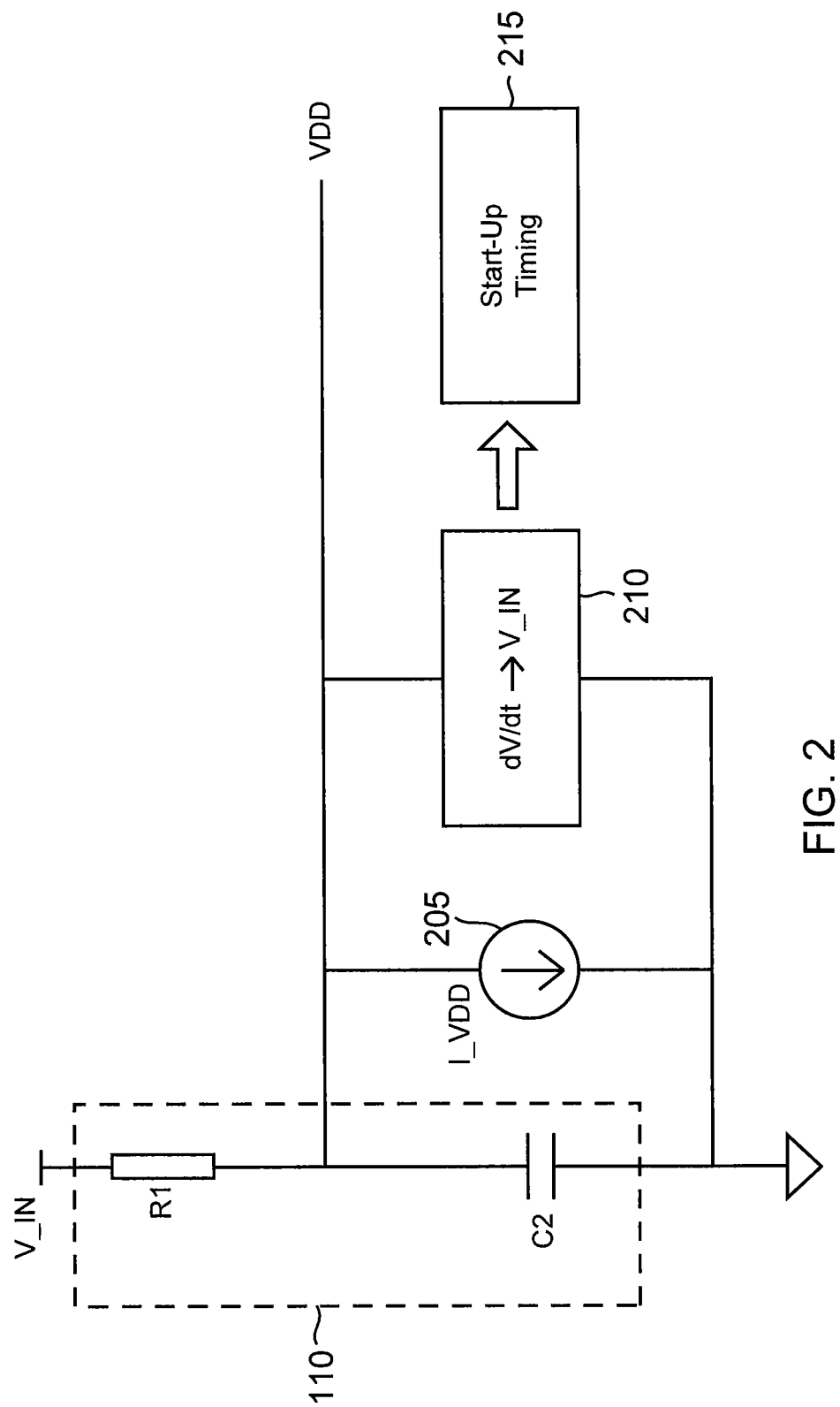
FIG. 2 illustrates a measurement circuit and a start-up timing circuit for the controller of FIG. 1.
Figure 3:
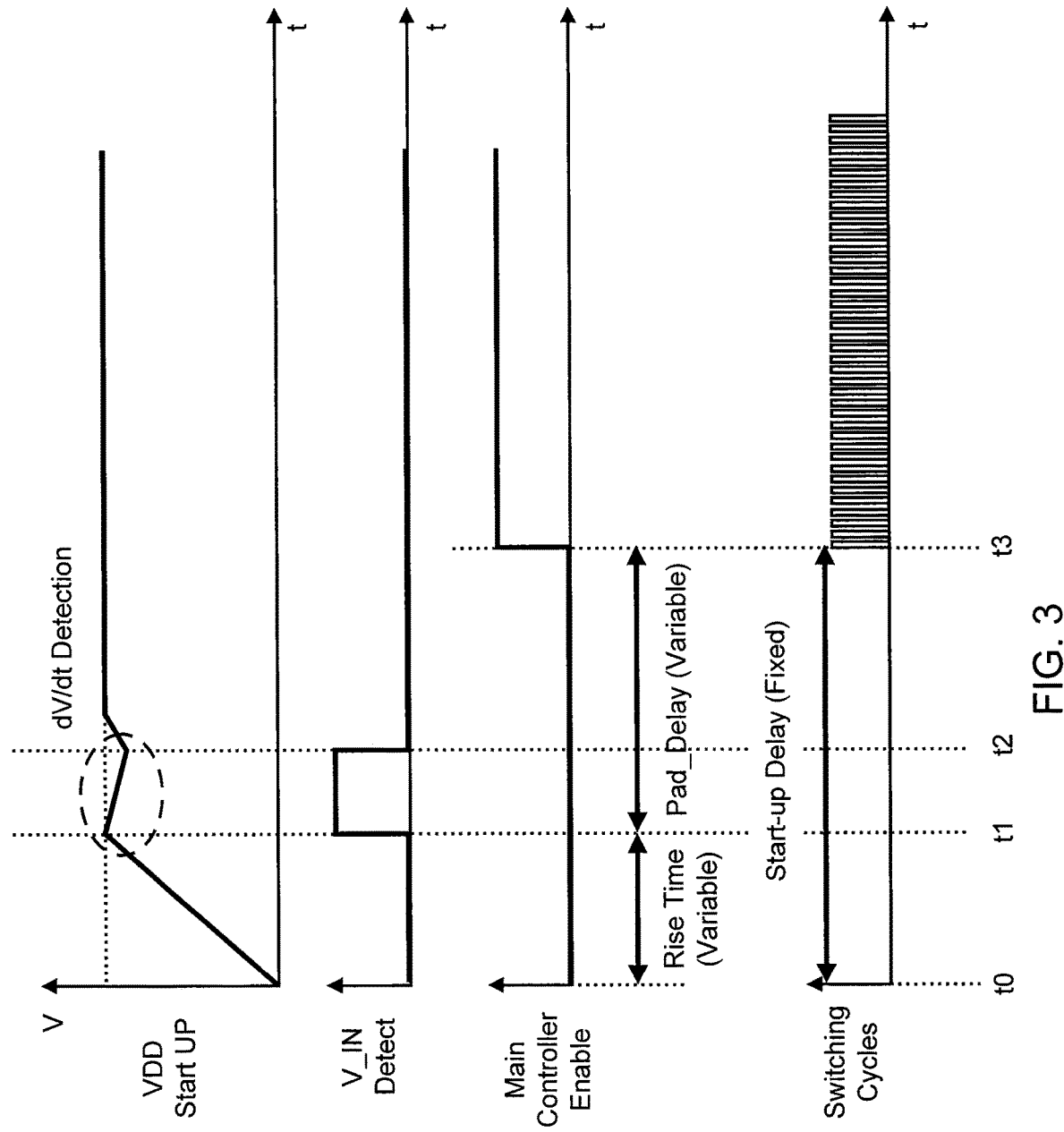
FIG. 3 illustrates some timing waveforms for the controller of FIG. 1.

Controller U1 responds to the controller power supply voltage reaching the POR level by applying a load across power supply capacitor C2. For example, as shown in FIG. 2, controller U1 may include a current source that conducts a current I_VDD during an input voltage detection period following the power-on reset of controller U1. The timing of the input voltage detection (V_IN Detect) period is shown in FIG. 3. At a time t0, the switching power supply is connected to the AC mains such that the input voltage V_IN powers passive start-up circuit 110 to charge the controller power supply voltage VDD from ground until it reaches a threshold level such as the power-on reset level at a time t1. In response to the controller power supply voltage increasing to the POR level, controller U1 begins the input voltage detection period at time t1 by activating a load such as current source 205 to conduct a current I_VDD. Current source 205 couples across power supply capacitor C2 so that current I_VDD discharges power supply capacitor C2 to lower the power supply voltage VDD. At a time t2, controller U1 terminates the input voltage detection period. A measurement circuit 210 in controller U1 measures the drop in the power supply voltage VDD over the input voltage detection period to determine the input voltage. In the determination, measurement circuit 210 uses the known values of the resistance for resistor R1, the capacitance for power supply capacitor C2, the voltage drop dV/dt for the power supply voltage VDD, and the current I_VDD to calculate the input voltage. In particular, it can be shown that the voltage drop for the controller power supply voltage equals an integral of (I_VDD−(input voltage/R1))/C1 over the duration of the input voltage determination. For example, if I_VDD equals 200 µA, R1 equals 1 MΩ, C1 equals 1 µF, and the duration is 10 ms, then the input voltage equals 100V. With the input voltage determined, a start-up timing circuit 215 in controller U1 adjusts the delay period from POR time t1 to a time t3 in which controller U1 begins normal operation by cycling the power switch. This delay adjustment keeps the start-up delay period to be substantially constant despite variations in the AC voltage line level.

Figure 4:
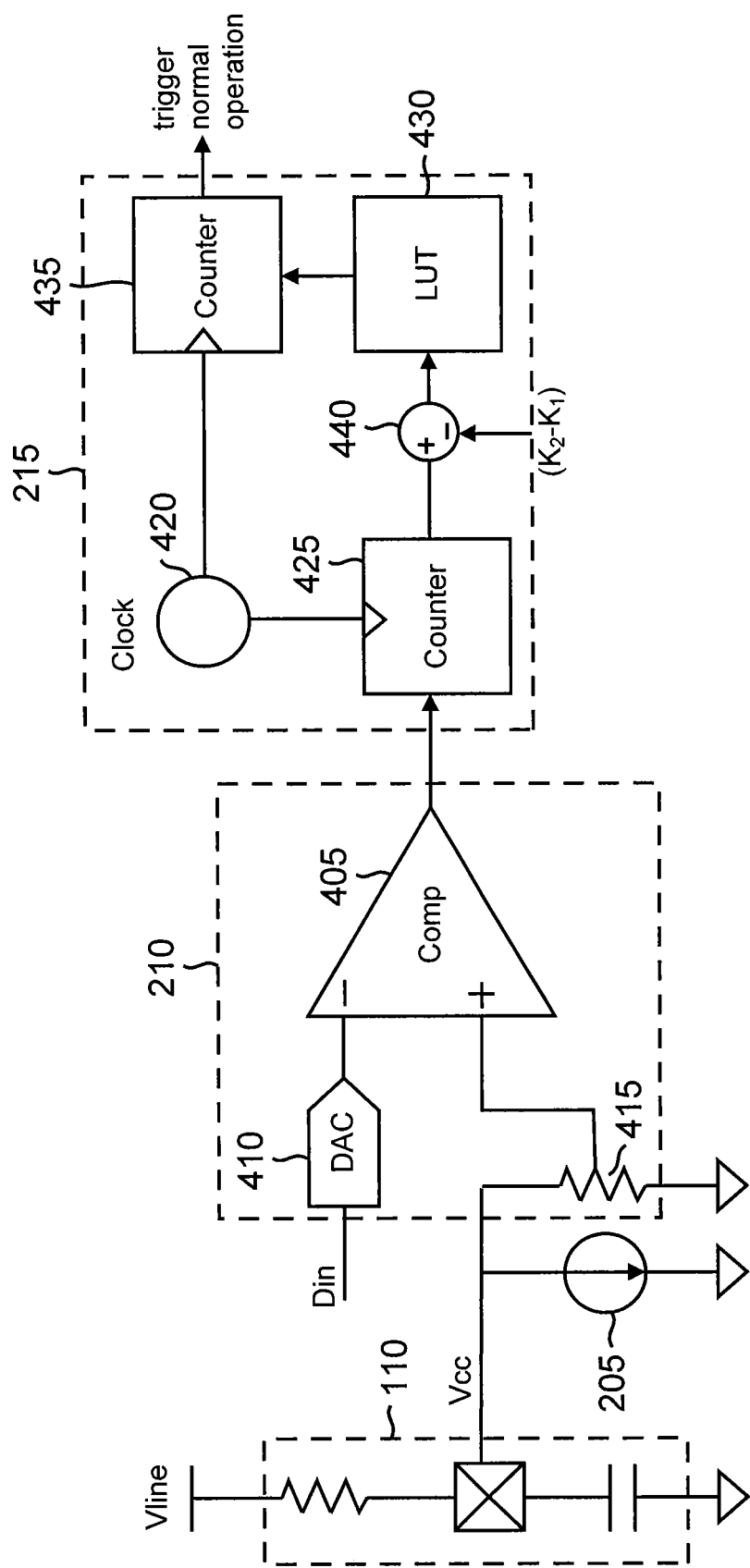
FIG. 4 illustrates an example low-power implementation of the measurement circuit and start-up timing circuit of FIG. 2.

Measurement circuit 210 and start-up timing circuit 215 should be relatively low-power since they operate during the start-up delay period during which the power switch is not cycled to maintain the controller power supply voltage. Instead, it is only passive start-up circuit 110 that maintains the controller power supply voltage during the start-up delay period. Example low-power implementations for measurement circuit 210 and start-up timing circuit 215 are shown in FIG. 4. Measurement circuit 210 may include a comparator 405 that compares a divided version of the controller power supply voltage to a reference voltage from a digital-to-analog converter (DAC) 410. A voltage divider 415 divides the controller power supply voltage to form the divided version but it will be appreciated that comparator 405 may instead compare an undivided version of the controller power supply voltage in alternative embodiments. When the controller power supply voltage reaches the threshold level (e.g, the POR level) during start-up, controller U1 increases a digital input signal Din to DAC 410 to determine the comparator tripping point. The analog DAC output voltage continues to increase in response to the increase in the digital input signal Din until the analog DAC output voltage equals the divided version of the controller output voltage. It is at this tripping point that the output signal from comparator 405 changes its binary state. The analog DAC output voltage drives the inverting input to comparator 405 so that the comparator output signal goes low to ground at the comparator tripping point but it will be appreciated that the comparator inputs may be reversed in alternative embodiments such that the comparator output signal would go binary high at the comparator tripping point.

The sweeping of the digital input signal occurs prior to the application of the load such as through the switching on of current source 205. To measure the slew rate of the controller power supply voltage in response to the application of the load, the digital input signal is reduced by a factor M (M begin an arbitrary amount set by design). The output of DAC 410 in that case is the analog voltage resulting from the conversion of the (N−M) digital input. The input voltage detection period is then determined by the amount of time necessary for the controller power supply voltage dropping from the POR level to the analog voltage resulting from the conversion of the (N−M) digital input. To time the input voltage detection period, start-up timing circuit 215 may include a counter 425 that counts cycles of a clock signal from a clock source 420. The counting begins at the beginning of the input voltage detection period as triggered by the setting of the digital input signal to (N−M). When the controller power supply voltage drops to equal the analog voltage resulting from the conversion of the (N−M) digital input, the output of comparator 405 goes low to trigger counter 425 to stop counting. The duration of the input voltage detection period is then represented by a resulting input voltage detection count from counter 425.

During design, a manufacturer may determine the count during the input voltage detection period from a high AC line condition and also from a low AC line condition. Suppose that the count for the high AC line condition is an integer K2 whereas the count from the low AC line condition is an integer K1. A threshold count may then be set to equal (K2−K1)/2. To determine the start-up delay period, controller U1 may then compare the input voltage detection count to the threshold count. For example, the input voltage detection count will be greater than the threshold count for a relatively low AC line condition. Controller U1 would then shorten the start-up delay period since it takes a relatively long amount of time for the controller power supply voltage to reach the POR level from ground in such a low AC line condition. Conversely, the input voltage detection count will be less than the threshold count for a relatively high AC line condition. Controller U1 would then increase the start-up delay period since it takes a relatively short amount of time for the controller power supply voltage to reach the POR level from ground in such a high AC line condition. In this fashion, controller U1 keeps the start-up delay period substantially constant despite AC line variations.

To provide the adjustment to the start-up delay period, start-up timing circuit 215 may include an adder 440 that calculates the difference between the input voltage detection count and the threshold count. A look-up table (LUT) 430 may then generate a start-up delay period count responsive to this difference. A counter 435 then counts to the start-up delay period count according to cycles of the clock signal to time the start-up delay period. LUT 430 is programmed to adjust the start-up delay period count so that the start-up delay period is substantially constant despite any AC line variations. In alternative embodiments, counter 425 may also function as counter 435. Once the start-up delay period count is satisfied, controller U1 begins normal operation.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power supply controller for a switching power supply, comprising:
a load configured to load a power supply capacitor for a passive start-up circuit during an input voltage measurement period following a connection of the switching power supply to an AC mains;
a measurement circuit configured to measure a decrease for a controller power supply voltage stored on the power supply capacitor due to the load; and
a start-up timing circuit configured to determine an input voltage for the switching power supply responsive to a measurement of a duration of the input voltage determination period and of the decrease in the controller power supply voltage, wherein the start-up timing circuit is further configured to adjust a duration of a start-up delay period responsive to the input voltage determination, and wherein the switching power supply controller is configured to begin normal operation at an expiration of the start-up delay period.

2. The switching power supply controller of claim 1, wherein the load is a current source.

3. The switching power supply controller of claim 1, wherein the measurement circuit includes a comparator configured to compare the controller power supply voltage to an analog voltage.

4. The switching power supply controller of claim 3, wherein the measurement circuit further includes a digital-to-analog converter configured to generate the analog voltage responsive to a digital input signal.

5. The switching power supply controller of claim 4, wherein the measurement circuit is configured to set the digital input signal at a high level at a beginning of the input voltage measurement period and to set the digital input signal at a low level following the beginning of the input voltage measurement period, wherein the low level is less than the high level.

6. The switching power supply controller of claim 3, wherein the measurement circuit further includes a voltage divider for providing a divided version of the controller power supply voltage, and wherein the comparator is further configured to compare the divided version of the controller power supply to the analog voltage.

7. The switching power supply controller of claim 1, wherein the start-up timing circuit includes a timer configured to time the duration of input voltage measurement period.

8. The switching power supply controller of claim 7, wherein the start-up timing circuit further includes a look-up table configured to process the duration of the input voltage measurement period to determine the duration of the start-up delay period so that the start-up delay period is substantially constant despite an AC line variation for the AC mains.

9. The switching power supply controller of claim 7, wherein the timer is configured to count cycles of a clock signal to time the duration of the input voltage measurement.

10. The switching power supply controller of claim 1, wherein the switching power supply controller is configured to apply the load responsive to the controller power supply voltage equaling a threshold level.

11. The switching power supply controller of claim 10, wherein the threshold level is a power-on-reset level for the switching power supply controller.

12. A method for a switching power supply, comprising:
charging a controller power supply voltage stored across a power supply capacitor responsive to a connection of the switching power supply to an AC mains to begin a start-up delay period;
applying a load across the power supply capacitor responsive to the power supply voltage increasing to a threshold level to begin an input voltage measurement period during the start-up delay period;
measuring a rate of change for the controller power supply voltage during the input voltage measurement;
determining an input voltage for the switching power supply responsive to the measurement of the rate of change for the controller power supply voltage; and
adjusting a duration of the start-up delay period responsive to the determination of the input voltage.

13. The method of claim 12, wherein charging the controller power supply voltage is performed by a passive start-up circuit.

14. The method of claim 12, wherein applying the load comprises applying a current source.

15. The method of claim 12, wherein determining the rate of change comprises comparing a version of the controller power supply voltage to an analog voltage threshold.

16. The method of claim 15, wherein comparing the version of the controller power supply voltage to the analog voltage threshold comprises comparing the version of the controller power supply voltage to a first analog voltage threshold at a beginning of the input voltage determination period and comparing the version of the controller power supply voltage to a second analog voltage threshold following the beginning of the input voltage determination period, wherein the second analog voltage threshold is lower than the first analog voltage threshold.

17. The method of claim 16, wherein determining the rate of change comprises timing from when the controller power supply voltage drops from the first analog voltage threshold to the second analog voltage threshold.

18. The method of claim 12, further comprising:
beginning normal operation for the switching power supply following a termination of the start-up delay period.

19. The method of claim 12, wherein adjusting the duration of the start-up delay period comprises maintaining the start-up delay period substantially constant despite an AC line variation for the AC mains.

20. The method of claim 18, wherein beginning normal operation includes cycling a power switch to maintain the controller power supply voltage.

* * * * *